(12) United States Patent
Ramani et al.

(10) Patent No.: US 11,561,944 B2
(45) Date of Patent: Jan. 24, 2023

(54) METHOD AND SYSTEM FOR IDENTIFYING DUPLICATE COLUMNS USING STATISTICAL, SEMANTICS AND MACHINE LEARNING TECHNIQUES

(71) Applicant: Tata Consultancy Services Limited, Mumbai (IN)

(72) Inventors: Ganesh Prasath Ramani, Chennai (IN); Aasish Chandra, Gurgaon (IN); Jayanth Shenai, Naperville, IL (US); Raja Angamuthu, Chennai (IN); Pankaj Kumar Mishra, Paris (FR)

(73) Assignee: TATA CONSULTANCY SERVICES LLC, Mumbai (IN)

( * ) Notice: Subject to any disclaimer, the term of this patent is extended or adjusted under 35 U.S.C. 154(b) by 198 days.

(21) Appl. No.: 17/136,124

(22) Filed: Dec. 29, 2020

(65) Prior Publication Data

US 2021/0342320 A1   Nov. 4, 2021

(30) Foreign Application Priority Data

Mar. 27, 2020 (IN) .............................. 202021013506

(51) Int. Cl.
  *G06F 16/21*  (2019.01)
  *G06F 16/215*  (2019.01)
  (Continued)

(52) U.S. Cl.
  CPC .......... *G06F 16/215* (2019.01); *G06F 16/221* (2019.01); *G06F 40/211* (2020.01); *G06F 40/30* (2020.01); *G06N 20/00* (2019.01)

(58) Field of Classification Search
  CPC ...... G06F 16/221; G06F 40/211; G06F 16/15; G06F 40/30
  See application file for complete search history.

(56) References Cited

U.S. PATENT DOCUMENTS

| 7,103,608 B1 | 9/2006 | Ozbutun et al. |
| 10,452,627 B2 | 10/2019 | Kabra et al. |

(Continued)

FOREIGN PATENT DOCUMENTS

| CN | 102930024 A | 2/2013 |
| WO | WO 2012/013920 A1 | 2/2012 |

OTHER PUBLICATIONS

Liao, X. et al., "A Column Styled Composable Schema Matcher for Semantic Data-Types," Data Science Journal, 18(25):1-15 (2019).

*Primary Examiner* — Eliyah S. Harper
(74) *Attorney, Agent, or Firm* — Finnegan, Henderson, Farabow, Garrett & Dunner LLP

(57) ABSTRACT

With the availability of huge amount of data, it has becoming difficult to identify and manage duplicate data, especially when the data is in a plurality of columns. A method and system for identifying duplicate columns using statistical, semantics and machine learning techniques have been provided. The system provides a design framework to compare huge datasets at column level and identify potential duplicate columns, not based on the column title, but based on all of its values. The disclosure has ability to compare values in multiple columns and identify potential duplicate columns wherein comparison of values is not only for the exact match, but for semantic match, smart match, fuzzy match, and match after UOM conversion etc. using Statistical, semantics and machine learning techniques.

9 Claims, 4 Drawing Sheets

(51) Int. Cl.
 G06F 16/22 (2019.01)
 G06N 20/00 (2019.01)
 G06F 40/211 (2020.01)
 G06F 40/30 (2020.01)

(56) References Cited

U.S. PATENT DOCUMENTS

| | | | |
|---|---|---|---|
| 11,243,953 B2* | 2/2022 | Wagner | G06F 16/2471 |
| 2017/0351717 A1* | 12/2017 | Kabra | G06F 16/1748 |
| 2019/0188288 A1* | 6/2019 | Holm | G06F 16/211 |
| 2019/0384762 A1* | 12/2019 | Hill | G06F 16/9535 |
| 2020/0073988 A1* | 3/2020 | Liu | G06F 16/254 |
| 2021/0149896 A1* | 5/2021 | Yu | G06F 16/2456 |

* cited by examiner

METHOD AND SYSTEM FOR IDENTIFYING DUPLICATE COLUMNS USING STATISTICAL, SEMANTICS AND MACHINE LEARNING TECHNIQUES

PRIORITY CLAIM

This U.S. patent application claims priority under 35 U.S.C. § 119 to: India Application No. 202021013506, filed on Mar. 27, 2020. The entire contents of the aforementioned application are incorporated herein by reference.

TECHNICAL FIELD

The disclosure herein generally relates to the field of column level deduplication, and, more particularly, to a method and system for identifying duplicate columns using statistical, semantics and machine learning techniques.

BACKGROUND

In today's scenario, information is very important and organizations are in quest for data that provides meaningful insights and help them make better business decisions, both tactically and strategically. The objective of an IT manager is to capture data from every possible source, store it in its simplest form, retrieve efficiently and manage it throughout its life cycle.

As storage costs are becoming cheaper day-by-day, IT managers prefer to store as much data as possible, even if it is duplicate in some form or other. However, the challenge to organizations is not the cost involved in storing Petabytes of data, but the effectiveness of the insights that comes out, while analyzing this data. While plenty of data is good, at times, it harms too. A fine balance is required to be maintained between managing lots of data fearing that they would lose some useful data versus managing the IT spend optimally.

The IT manager can choose one of available two options, with respect to handling duplicate data. First, store duplicate data on arrival, and handle it while processing the data and generating insights. Second, identify duplicate data on arrival, handle it and store without redundancy. While first option is more favorable as compared to second, it increases the chance of errors in the generated insights. However, with second option, there is an additional overhead of identifying and eliminating duplicates before storing. This can affect velocity of incoming data. Thus, it is necessary to remove duplicates from the input data.

There are two formats of data duplication, row level duplicates and column level duplicates. Plenty of tools are available in the prior art, which identify duplicates across rows, and tag the duplicates for further clean up. However identifying duplicates across columns continues to pose a challenge.

Capturing, storing, processing of duplicate data (any master data management systems) impacts the quality, cost, time and resources. Ability to identify column level duplicates will help organizations to de-duplicate them and save huge on cost, time, resources and improve the quality of data deliveries. Comparing of values in different columns by human is a tedious process and have limitations.

SUMMARY

Embodiments of the present disclosure present technological improvements as solutions to one or more of the above-mentioned technical problems recognized by the inventors in conventional systems. For example, in one embodiment a system for identifying duplicate columns among a plurality of columns has been provided. The system comprises an input/output interface, one or more hardware processors and a memory. The input/output interface receives an input data from an input file, wherein the input data is in the form of tabular data having a plurality of rows and the plurality of columns. The memory in communication with the one or more hardware processors, the one or more hardware processors further configured to perform the steps of: preprocessing the input data; deriving a statistical score for each pair of columns from possible pairs of columns in the plurality of columns in the preprocessed input data; selecting a first set of pair of columns from the possible pairs of columns, wherein the first set of pair of columns satisfies a predefined condition, and wherein the first predefined condition is the statistical score for the pair of columns is more than a first threshold value; performing a row level analysis on the selected first set of pair of columns using one or more of: a fuzzy logic technique, a semantic level analysis using a word embedding technique, wherein the word present in the plurality of columns, checking the concurrence of a plurality of words on the selected first set of pair of columns, and utilizing a look up table after converting unit of measures of the input data, wherein the row level analysis results in generation of a row level score; selecting a set of characteristic pair of columns out of the first set of pair of columns if the generated row level score is more than a second threshold value; and identifying the selected set of characteristic pair of columns as duplicate columns in the form of an output file.

In another aspect, the embodiment here provides a method for identifying duplicate columns among a plurality of columns. Initially, an input data is received from an input file by an input/output interface. The input data is in the form of tabular data having a plurality of rows and the plurality of columns. Further, the input data is preprocessed. In the next step, a statistical score is derived for each pair of columns from possible pairs of columns in the plurality of columns in the preprocessed input data. Further, a first set of pair of columns is selected from the possible pairs of columns, wherein the first set of pair of columns satisfies a predefined condition, and wherein the first predefined condition is the statistical score for the pair of columns is more than a first threshold value. Later, a row level analysis is performed on the selected first set of pair of columns using one or more of: a fuzzy logic technique, a semantic level analysis using a word embedding technique, wherein the word present in the plurality of columns, checking the concurrence of a plurality of words on the selected first set of pair of columns, and utilizing a look up table after converting unit of measures of the input data, wherein the row level analysis results in generation of a row level score. In the next step, a set of characteristic pair of columns is selected out of the first set of pair of columns if the generated row level score is more than a second threshold value. And finally, the selected set of characteristic pair of columns are identified as duplicate columns in the form of an output file.

In another aspect the embodiment here provides one or more non-transitory machine readable information storage mediums comprising one or more instructions which when executed by one or more hardware processors cause identifying duplicate columns among a plurality of columns. Initially, an input data is received from an input file by an input/output interface. The input data is in the form of tabular data having a plurality of rows and the plurality of columns. Further, the input data is preprocessed. In the next step, a statistical score is derived for each pair of columns from possible pairs of columns in the plurality of columns in the preprocessed input data. Further, a first set of pair of columns is selected from the possible pairs of columns, wherein the first set of pair of columns satisfies a predefined condition, and wherein the first predefined condition is the statistical score for the pair of columns is more than a first threshold value. Later, a row level analysis is performed on the selected first set of pair of columns using one or more of: a fuzzy logic technique, a semantic level analysis using a word embedding technique, wherein the word present in the plurality of columns, checking the concurrence of a plurality of words on the selected first set of pair of columns, and utilizing a look up table after converting unit of measures of the input data, wherein the row level analysis results in generation of a row level score. In the next step, a set of characteristic pair of columns is selected out of the first set of pair of columns if the generated row level score is more than a second threshold value. And finally, the selected set of characteristic pair of columns are identified as duplicate columns in the form of an output file.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
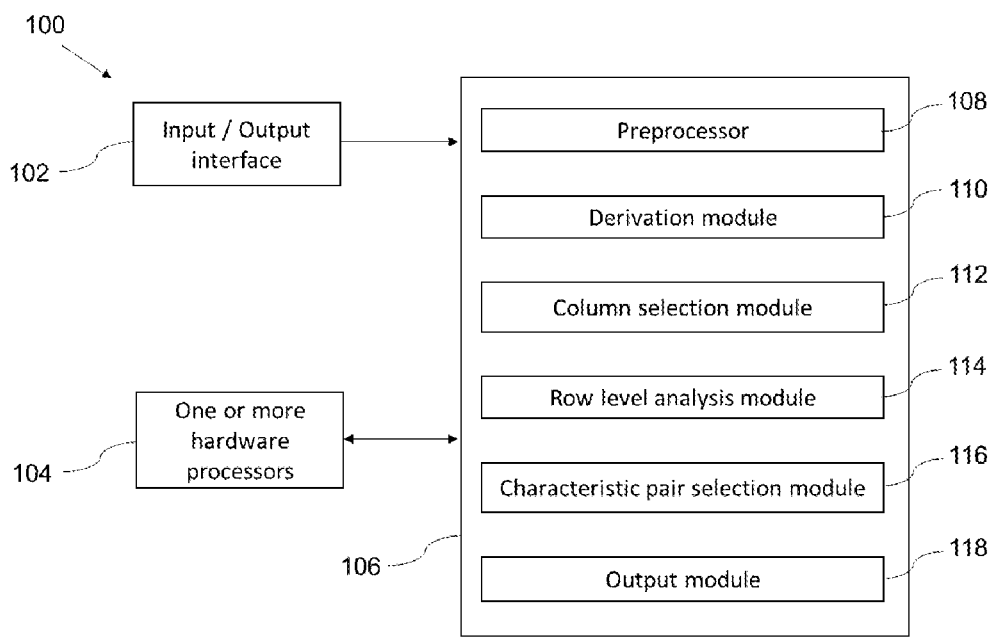
FIG. 1 shows a block diagram of a system for identifying duplicate columns among a plurality of columns according to an embodiment of the present disclosure.
Figure 2:
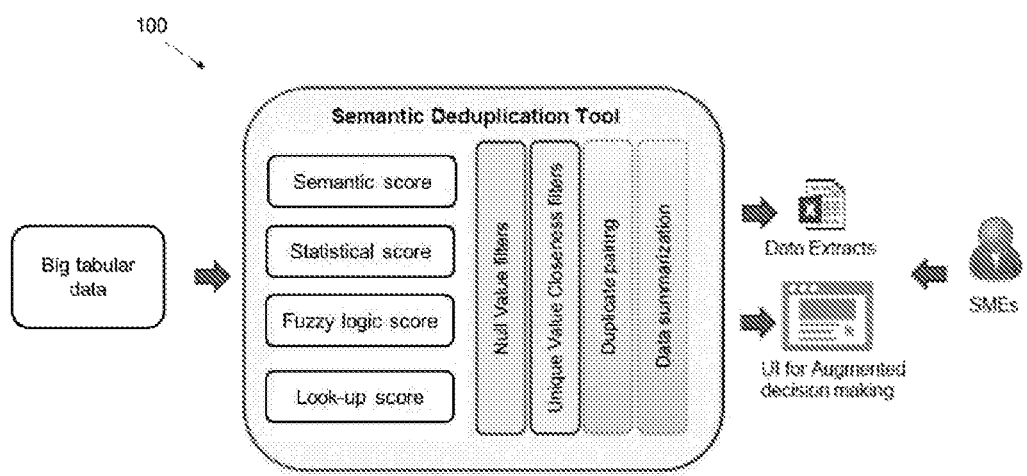
FIG. 2 shows a schematic representation of the system of FIG. 1 for identifying duplicate columns among a plurality of columns according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method.

According to an embodiment of the disclosure, a system 100 for identifying duplicate columns among a plurality of columns. The system 100 provides a design framework to compare huge datasets at column level and identify potential duplicate columns, not based on the column title, but based on all of its values. The system 100 utilizes statistical, semantics based and machine learning based techniques for the identification of duplicates in a huge dataset.

According to an embodiment of the disclosure, the system 100 comprises an input/output interface 102, one or more hardware processors 104 and a memory 106 in communication with the one or more hardware processors 104 as shown in the block diagram of FIG. 1. The one or more hardware processors 104 work in communication with the memory 106. The one or more hardware processors 104 are configured to execute a plurality of algorithms stored in the memory 106. The memory 106 further includes a plurality of modules for performing various functions. The memory 106 comprises a preprocessor 108, a derivation module 110, a column selection module 112, a row level analysis module 114, a characteristics pair selection module 116 and an output module 118. The memory 106 may further comprise other modules for performing certain functions. The system 100 also comprises a database 120.

According to an embodiment of the disclosure, the input/output interface 102 is configured to provide an input data from an input file. The input data is in the form of tabular data having a plurality of rows and the plurality of columns. The input data may be received in any format which is capable of having tabular forms. The input file may be in a format selected from at least one or more of comma separated value (.csv) format, XLS format, XLSX format. The system 100 is configured to work with the input file of up to more than 10000 rows and more than 150 columns. It should be appreciated that the input file could be of more than one type. In case the data can be merged in to one single format. The input/output interface 102 is accessible to a user via smartphones, laptop or desktop configuration thus giving the user the freedom to interact with the system 100 from anywhere anytime. The input/output interface 102 may include a variety of software and hardware interfaces, for example, interfaces for peripheral device(s), such as a keyboard, a mouse, an external memory, a camera device, and a printer. The input/output interface 102 can facilitate multiple communications within a wide variety of networks and protocol types, including wired networks, for example, local area network (LAN), cable, etc., and wireless networks, such as Wireless LAN (WLAN), cellular, or satellite.

According to an embodiment of the disclosure, the system 100 comprises the preprocessor 108. The preprocessor 108 is configured to preprocess the input data. The preprocessing includes various steps such as, but not limited to following steps. The preprocessor 108 is configured to exclude the columns out of the plurality of columns whose attributes do not have any value (nulls and null equivalents). The preprocessors 108 is further configured to exclude the rows out of the plurality of rows having non-positive values such as 'not stated', 'not available' etc. The preprocessor 108 is also configured to maintain a custom configuration which are specific to a set of conditions.

According to an embodiment of the disclosure, the memory 106 further comprises the derivation module 110. The derivation module 110 is configured to derive a statistical score for each pair of columns possible out of the plurality of columns in the preprocessed input data. If there are n number of columns in the input data, then there are a possible of (n(n−1))/2 combinations are possible According to an embodiment of the disclosure, the memory 106 comprises the column selection module 112. The columns selection module 112 is configured to select a first set of pair of columns out of the pair of columns if a first predefined condition is satisfied. The first predefined condition is the statistical score for the pair of columns is more than a first threshold value. The first threshold value is chosen based on user experience. This step reduces the number of pairs for further processing.

According to an embodiment of the disclosure, the memory 106 comprises the row level analysis module 114. The row level analysis module 114 is configured to perform a row level analysis on the selected first set of pair of columns using one or more of following techniques. The row level analysis results in generation of a row level scores. A fuzzy logic technique can be used. In fuzzy level technique a fuzzy score is calculated. The fuzzy score indicates the similarity score between two strings, and helps to identify mismatches due to space, spelling mistakes, etc.

Another technique involves a semantic level analysis using a word embedding technique. The semantic level technique generates a semantic score. The semantic score provides semantic textual similarity in the pair. The semantic score deals with determining how similar two pieces of texts are, with respect to its meaning.

Yet another technique involves checking the concurrence of a plurality of words on the selected first set of pair of columns. This technique involves calculation of a statistical score. The statistical score is derived using a Kramer's correlation method. The use of any other method is well within the scope of this disclosure. The statistical score is based on the association between any two text strings using statistical models.

Yet another technique involves utilizing a look up table after converting unit of measures of the input data. The look up table involves generation of look up score. The method involves lookup-based data resolution, before arriving at the match score. It can be either 0 (No match) or 1 (Match), post data transformation via lookup. This technique is used while performing UOM Conversion for comparing data. Lookup for Conversion Factor between different UOMs within and across domains. For example while matching in same domain, Liter to Milliliter, Liter to Centiliter etc. While across domains: Weight Vs Volume—Kilogram to Liter, Gram to Milliliter etc.

According to an embodiment of the disclosure, the memory 106 comprises the characteristics pair selection module 116. The characteristic pair selection module 116 is configured to select a set of characteristic pair of columns out of the first set of pair of columns if the generated row level score is more than a second threshold value. Again, the second threshold value is chosen by an expert working in the field of the disclosure. This step further reduces the number of pairs for review.

According to an embodiment of the disclosure, the memory 106 comprises the output module 118. The output module 118 is configured to provide the selected set of characteristic pair of columns as duplicate columns in the form of an output file. The output file is also in the same format as the input file. The selected set of characteristic pair of columns may further be provided to a subject matter expert. SMEs review the details provides and finalize suitable duplicate pairs that can be potentially deduped.

Figure 3A:
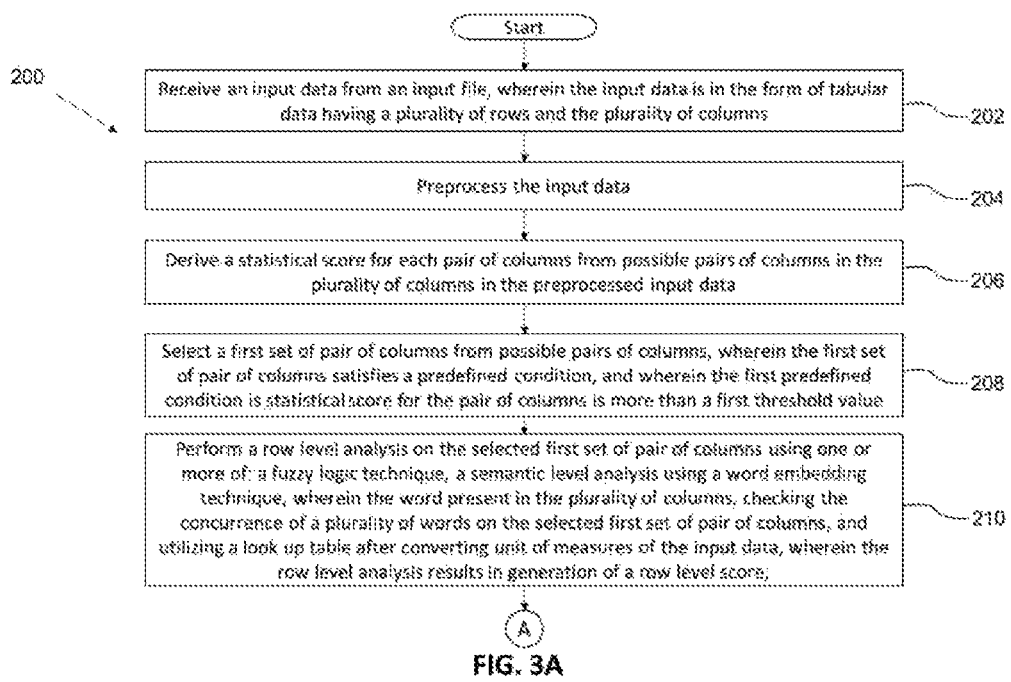
FIGS. 3A-3B show a flowchart illustrating the steps involved in identifying duplicate columns among a plurality of columns according to an embodiment of the present disclosure.
Figure 3B:
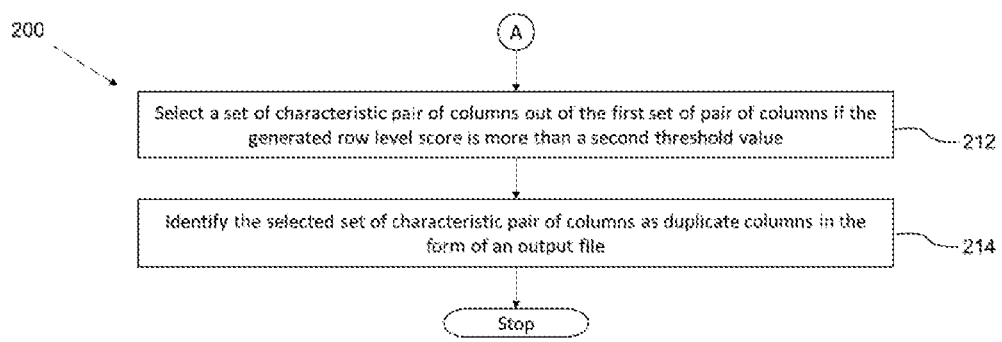

In operation, a flowchart 200 illustrating a method for identifying duplicate columns among a plurality of columns is shown in FIG. 3A-3B. Initially at step 202, the input data is provided from an input file. The input data is in the form of tabular data having a plurality of rows and the plurality of columns. The input data may be in the form of .CSV, .XLS, .XLSX etc. Further at step 204, the input data is preprocessed. The preprocessing is done to reduce various anomalies in the data.

At step 206, a statistical score is derived for each pair of columns possible out of the plurality of columns in the preprocessed input data. At step 208, the first set of pair of columns is selected out of the pair of columns if the first predefined condition is satisfied. The first predefined condition is the statistical score for the pair of columns is more than the first threshold value.

Further at step 210, the row level analysis is performed on the selected first set of pair of columns using one or more of: a fuzzy logic technique, a semantic level analysis using the a word embedding technique, checking the concurrence of a plurality of words on the selected first set of pair of columns, and utilizing a look up table after converting unit of measures of the input data, wherein the row level analysis results in generation of a row level scores. At step 212, a set of characteristic pair of columns is selected out of the first set of pair of columns if the generated row level score is more than the second threshold value. The first threshold value and the second threshold value are decided by the user who is expert in the domain. Finally, at step 214, the selected set of characteristic pair of columns is provided as duplicate columns in the form of the output file in the same format as the input file.

According to an embodiment of the disclosure, the system 100 can also be explained with the help of following example. In a situation where it is required to capture different attributes of the product sold in the market. Let's visualize these attributes as individual columns of the table in the Relational DB representation. Since the sales of the product is across multiple countries, individual countries have created their own attribute and captured the same/similar values in multiple columns. However, they are duplicate and there is a need to identify the duplicate ones, not based on the attribute name, but based on the attribute values. An example of same is shown below in TABLE 1.

TABLE 1

Multiple Attributes have the same value for an Item

| Attribute | Attribute Value |
|---|---|
| FLAVOUR | COLA |
| FLAVOUR GROUP | COLA |
| FLAVOUR OF NON-ALCOHOLIC BEVERAGES | COLA |
| UK - FLAVOUR | COLA |
| UK - FLAVOUR GROUP | COLA |

There are multiple items in the same category and hence it is needed to compare the values for multiple rows, typically in the range of few 10 Ks. Hence, this data can be visualized for multiple items as shown in TABLE 2:

TABLE 2

Data for multiple items

| Item ID | Item Description | Flavour | Flavour Group | Flavour of Non-Alcoholic Beverages | UK - Flavour | UK - Flavour Group |
|---|---|---|---|---|---|---|
| 1 | Coca Cola 100 ML | COLA | COLA | COLA | COLA | COLA |
| 2 | Pepsi Cola 250 ML | COLA | COLA | COLA | COLA | COLA |
| 3 | Coca Cola 0.5 L | COLA | COLA | COLA | COLA | COLA |
| ... | ... | ... | ... | ... | ... | ... |
| N | Pepsi Cola 1 L | COLA | COLA | COLA | COLA | COLA |

Further, the requirement becomes complex, when the values do not match exactly, but match contextually (fuzzy match) as shown below in TABLE 3 for a different set of attributes:

TABLE 3

Data showing values match contextually

| Item ID | Item Description | Number in Each Pack | Total Items in Pack | Total Items in Package | UK - Base Number in Multipack |
|---|---|---|---|---|---|
| 1 | Coca Cola 100 ML | 10'S | 10 UN | 10 UN | 10 PACK |
| 2 | Pepsi Cola 250 ML | 8'S | 8 UN | 8 UN | 8 PACK |
| 3 | Coca Cola 0.5 L | 2'S | 2 UN | 2 UN | 2 PACK |
| ... | ... | ... | ... | ... | ... |
| N | Pepsi Cola 1 L | 1'S | 1 UN | 1 UN | 1 PACK |

In both the illustration shown above in TABLE 2 and TABLE 3, it can be decided to retain one of the attributes and eliminate the other duplicate attributes (i.e., de-duplicate).

Further, column-pairs with very good statistical score indicates high match. For Example, Column-Pair "Flavour Vs Flavour Group" would have match score say 0.989 and Column-Pair "Flavour Vs Total Items in Pack" would have match score say 0.053. It is now evident that the earlier Column-pair is having better match compared to the later one.

Further TABLE 4 shows an example of the lookup table-based row level analysis. For some of the attributes, it was found that a need to perform UOM Conversion during comparison. This lookup-based comparison provided a meaningful score for such attributes.

TABLE 4

Lookup table-based comparison

| Item ID | Item Description | Base Volume | UK - Base Volume | Actual Volume | UK - Actual Volume |
|---|---|---|---|---|---|
| 1 | Coca Cola 100 ML | 100 ML | 100 ML | 100 ML | 100 ML |
| 2 | Pepsi Cola 250 ML | 250 ML | 250 ML | 250 ML | 250 ML |
| 3 | Coca Cola 0.5 L | 500 ML | 0.5 L | 500 ML | 0.5 L |
| ... | ... | ... | ... | ... | ... |
| N | Pepsi Cola 1 L | 1000 ML | 1 L | 1000 ML | 1 L |

As shown in the TABLE 4, even though the Unit of Measurement is indicated differently for different attributes, the underlying value remains same. In some cases, the value is captured differently with or without space. Also, there is a need to split Numerical Value & string based UOM to convert between different UOMs. Regular Expressions comes handy here.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein solve the problems of time taking and tedious process for identifying duplicate columns. The disclosure provides a method and system for identifying duplicate columns using statistical, semantics and machine learning techniques.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for identifying duplicate columns among a plurality of columns, the method comprising:
   receiving, by an input/output interface, an input data from an input file, wherein the input data is in a form of tabular data having a plurality of rows and the plurality of columns;
   preprocessing, by one or more hardware processors, the input data;
   deriving, by the one or more hardware processors, a statistical score for each pair of columns from possible pairs of columns in the plurality of columns in the preprocessed input data, wherein the statistical score is derived using a Kramer's correlation method;
   selecting, by the one or more hardware processors, a first set of pair of columns from the possible pairs of columns, wherein the first set of pair of columns satisfies a predefined condition, and wherein the first predefined condition is the statistical score for the pair of columns is more than a first threshold value;
   performing, by the one or more hardware processors, a row level analysis on the selected first set of pair of columns using one or more of:
     a fuzzy logic technique,
     a semantic level analysis using a word embedding technique, wherein the word present in the plurality of columns
     checking a concurrence of a plurality of words on the selected first set of pair of columns, and
   utilizing a look up table after converting unit of measures of the input data, wherein the row level analysis results in generation of a row level score;
   selecting, by the one or more hardware processors, a set of characteristic pair of columns out of the first set of pair of columns if the generated row level score is more than a second threshold value; and
   identifying, by the one or more hardware processors, the selected set of characteristic pair of columns as duplicate columns in the form of an output file.

2. The method of claim 1, further comprising providing intervention by a subject matter expert by manually screening the identified duplicate columns.

3. The method of claim 1, wherein the preprocessing further comprises:
   excluding columns out of the plurality of columns whose attributes do not have any value,
   excluding rows out of the plurality of rows having non-positive values, and
   maintaining a custom configuration which are specific to a set of conditions.

4. The method of claim 1, further comprising removing the identified duplicate columns.

5. The method of claim 1, wherein the input file and the output file are in a form of at least one or more of comma separated value (.csv) format, XLS format, XLSX format.

6. The method of claim 1, wherein the preprocessing is preceded by merging the input data received from more than one type of input files.

7. A system for identifying duplicate columns among a plurality of columns, the system comprises:
   an input/output interface for receiving an input data from an input file, wherein the input data is in a form of tabular data having a plurality of rows and the plurality of columns;
   one or more hardware processors;
   a memory in communication with the one or more hardware processors, the one or more hardware processors further configured to perform the steps of:
     preprocessing the input data;
     deriving a statistical score for each pair of columns from possible pairs of columns in the plurality of columns in the preprocessed input data, wherein the statistical score is derived using a Kramer's correlation method;
     selecting a first set of pair of columns from the possible pairs of columns, wherein the first set of pair of columns satisfies a predefined condition, and wherein the first predefined condition is the statistical score for the pair of columns is more than a first threshold value;
     performing a row level analysis on the selected first set of pair of columns using one or more of:
       a fuzzy logic technique,
       a semantic level analysis using a word embedding technique, wherein the word present in the plurality of columns
       checking a concurrence of a plurality of words on the selected first set of pair of columns, and
     utilizing a look up table after converting unit of measures of the input data, wherein the row level analysis results in generation of a row level score;
     selecting a set of characteristic pair of columns out of the first set of pair of columns if the generated row level score is more than a second threshold value; and
     identifying the selected set of characteristic pair of columns as duplicate columns in the form of an output file.

8. The system of claim 7, wherein the input file and the output file are in a form of at least one or more of comma separated value (.csv) format, XLS format, XLSX format.

9. One or more non-transitory machine readable information storage mediums comprising one or more instructions which when executed by one or more hardware processors cause managing a plurality of events, the instructions cause:

receiving, by an input/output interface, an input data from an input file, wherein the input data is in a form of tabular data having a plurality of rows and the plurality of columns;

preprocessing the input data;

deriving a statistical score for each pair of columns from possible pairs of columns in the plurality of columns in the preprocessed input data, wherein the statistical score is derived using a Kramer's correlation method;

selecting a first set of pair of columns from the possible pairs of columns, wherein the first set of pair of columns satisfies a predefined condition, and wherein the first predefined condition is the statistical score for the pair of columns is more than a first threshold value;

performing a row level analysis on the selected first set of pair of columns using one or more of:
- a fuzzy logic technique,
- a semantic level analysis using a word embedding technique, wherein the word present in the plurality of columns
- checking a concurrence of a plurality of words on the selected first set of pair of columns, and
- utilizing a look up table after converting unit of measures of the input data, wherein the row level analysis results in generation of a row level score;

selecting a set of characteristic pair of columns out of the first set of pair of columns if the generated row level score is more than a second threshold value; and identifying the selected set of characteristic pair of columns as duplicate columns in the form of an output file.

* * * * *